(12) United States Patent
Yetzke

(10) Patent No.: US 7,559,417 B2
(45) Date of Patent: Jul. 14, 2009

(54) CLUTCH PRESSURE PLATE FOR MULTIPLE SPRING SYSTEMS

(76) Inventor: Steven Robert Yetzke, 1959 North Main St., Orange, CA (US) 92865

( * ) Notice: Subject to any disclaimer, the term of this patent is extended or adjusted under 35 U.S.C. 154(b) by 119 days.

(21) Appl. No.: 11/362,292

(22) Filed: Feb. 23, 2006

(65) Prior Publication Data

US 2006/0213749 A1 Sep. 28, 2006

Related U.S. Application Data

(60) Provisional application No. 60/665,147, filed on Mar. 25, 2005.

(51) Int. Cl.
F16D 13/50 (2006.01)
F16D 13/70 (2006.01)
(52) U.S. Cl. .................. 192/89.22; 192/89.26; 192/89.2
(58) Field of Classification Search ................ 192/89.2, 192/89.22, 89.24, 89.26, 70.29
See application file for complete search history.

(56) References Cited

U.S. PATENT DOCUMENTS

| | | | | |
|---|---|---|---|---|
| 2,025,854 A | * | 12/1935 | Freeman | 192/89.26 |
| 2,251,366 A | * | 8/1941 | Miller et al. | 192/70.27 |
| 2,714,437 A | * | 8/1955 | Spase | 192/70.27 |
| 2,852,116 A | * | 9/1958 | Spase | 192/89.22 |
| 3,365,042 A | * | 1/1968 | Smirl et al. | 192/89.2 |
| 4,116,322 A | * | 9/1978 | Ashfield | 192/70.29 |
| 4,585,105 A | * | 4/1986 | Iio et al. | 192/89.26 |
| 4,717,001 A | * | 1/1988 | Yoneda | 192/70.27 |
| 5,617,938 A | * | 4/1997 | Tsukada et al. | 192/89.22 |
| 5,636,721 A | * | 6/1997 | Weidinger | 192/70.27 |
| 5,730,267 A | * | 3/1998 | Lopez | 192/70.27 |
| 6,216,839 B1 | * | 4/2001 | Rudolf et al. | 192/70.27 |

* cited by examiner

*Primary Examiner*—Rodney H Bonck
(74) *Attorney, Agent, or Firm*—Bruce A. Jagger

(57) ABSTRACT

A multi-spring system pressure plate member is provided for a spring biased clutch. The pressure plate member has a spring side and an opposed clutch side. The spring side of the pressure plate member includes spring confinement members for at least two clutch spring systems. The spring confinement members serve to hold spring members on said spring side in operative association with said pressure plate member. The spring confining members are provided to confine at least a diaphragm spring element and a compression coil spring element. The pressure plate member is configured to accept without modification either a diaphragm spring element or a set of compression coil spring elements. The clutch can be converted from one spring system to another by simply changing the spring elements.

11 Claims, 4 Drawing Sheets

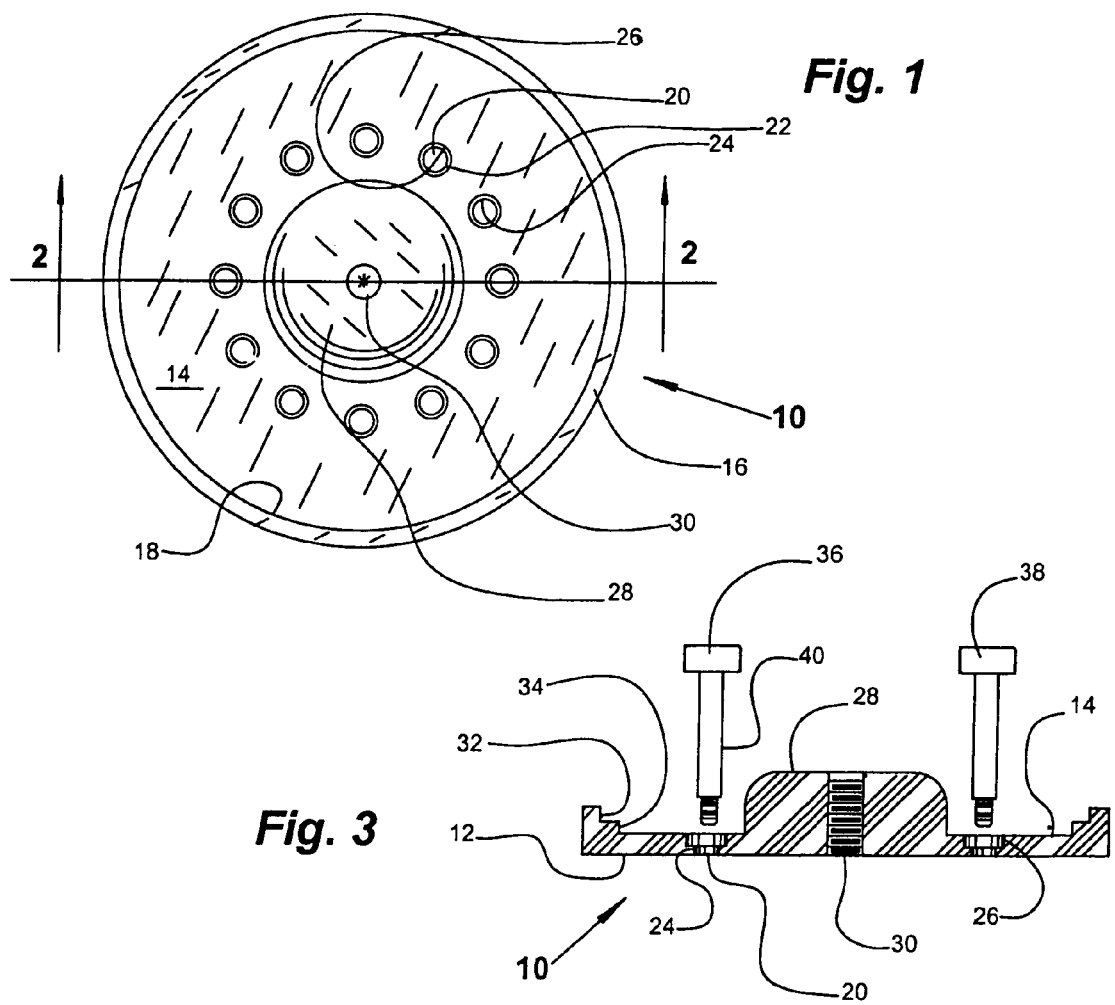
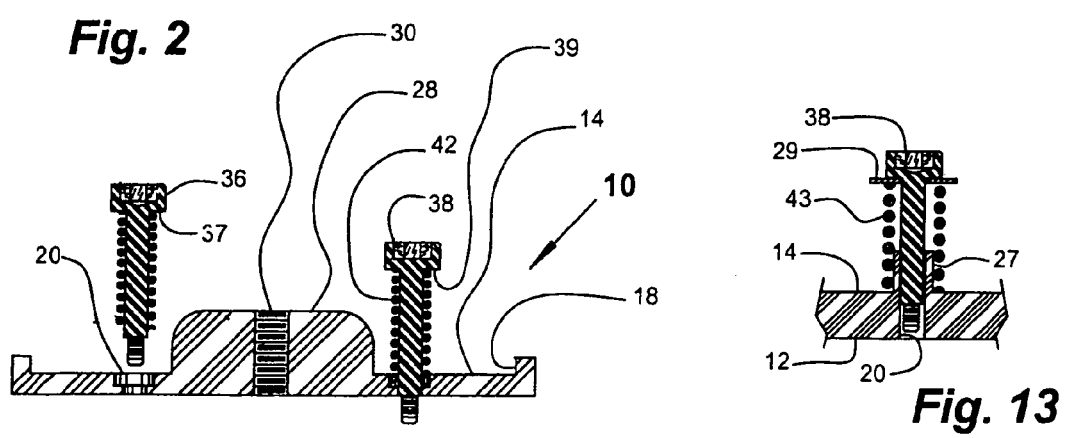

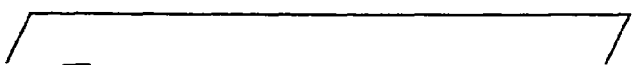
*Fig. 11*
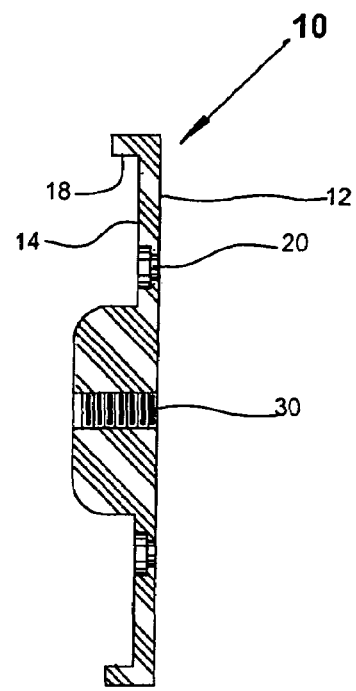
*Fig. 12*
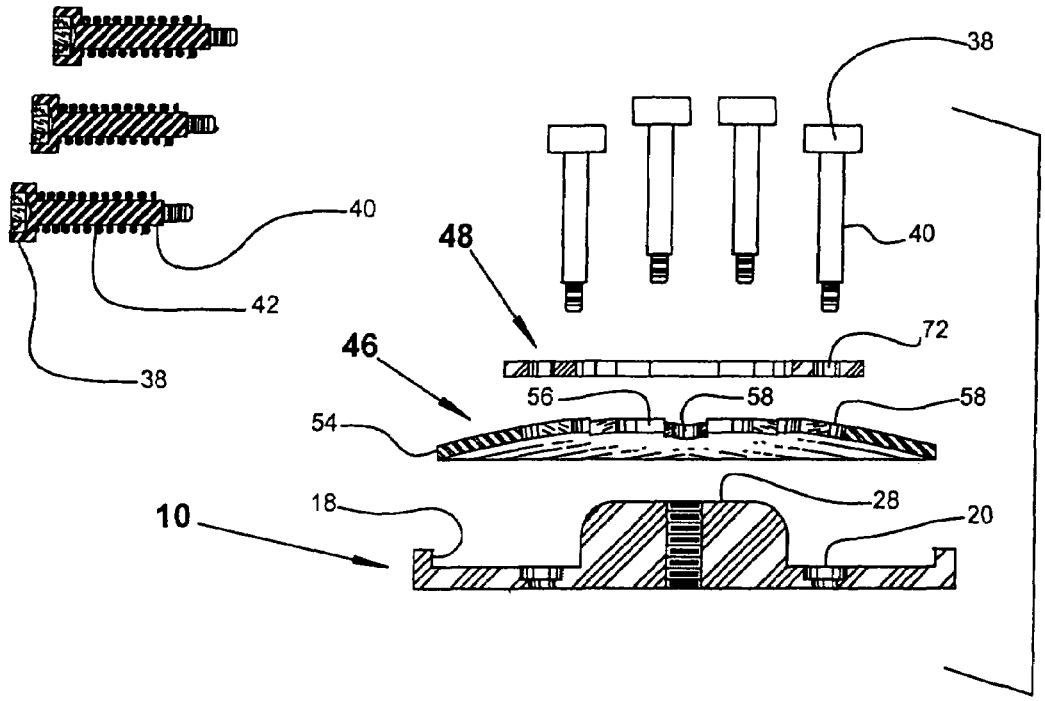

CLUTCH PRESSURE PLATE FOR MULTIPLE SPRING SYSTEMS

RELATED APPLICATIONS

This application claims the benefit of U.S. Provisional Application Ser. No. 60/665,147, filed Mar. 25, 2005.

BACKGROUND OF THE INVENTION

1. Field of the Invention

The invention relates in general to methods and devices for a clutch with multiple spring systems and, particularly, embodiments of the present invention relate to clutches wherein multiple spring systems with many common components are provided for clutch activation systems, and more particularly motorcycle clutches wherein one of a multiplicity of spring systems may be selected from common components to provide a preferred "feel" or other characteristic for the operation of a clutch.

2. Description of the Prior Art

Mechanical clutches are widely used in power transmissions systems between motors or engines and transmissions or other applications. Air, land, and sea vehicles, agricultural and grounds maintenance implements, construction equipment, stationary systems, and the like, all require the use of some type of clutch to disengage the engine from the application. Certain clutches, and particularly conventional motorcycle clutches, comprise a stack of friction discs and steel plates sandwiched between a generally axially fixed clutch hub and an axially moveable pressure plate. In the engaged position the friction disks and steel plates are forced together and rotate together so that power is transmitted through the clutch. In the disengaged position the disks and plates are slightly separated and do not rotate together, so power is not transmitted through the clutch.

Conventional spring biased pressure plates are generally spring biased into the engaged mode by either compression springs or a diaphragm spring. Conventional pressure plates generally can not accommodate both spring systems either when used concurrently or alternatively. Clutch control members are typically actuated to disengage the pressure plate from the stack of friction discs and steel plates. Disengagement typically involves moving the pressure plate axially against the force of the spring bias. The disengagement force must be sufficient to overcome the force of the spring bias.

The nature of the spring that serves to bias the pressure plate determines the "feel" or behavior of the clutch during engagement and disengagement. Compression springs resist disengaging the clutch with a force that increases progressively as the pressure plate moves towards full disengagement. The force is generally greatest in the fully disengaged configuration. A diaphragm spring (sometimes described as a bellville or disk spring) resists disengaging the pressure plate until the spring substantially flattens, at which point the force diminishes abruptly and substantially, so that little force is required to hold the clutch in the fully disengaged configuration. Upon engagement, the compression spring biased pressure plate systems tend to engage slowly and smoothly with some clutch slippage as the engagement phase of the cycle progresses. Diaphragm spring biased pressure plate systems tend to go very quickly from full disengagement to full engagement with little slippage.

When a clutch is required, for example, to function between a high horsepower motor (for example, over 80 horsepower) and a transmission, the force of the required spring bias may become so great that the clutch controls require some augmentation, such as hydraulic assistance. Such augmented systems may be configured and adjusted to mask the inherent "feel" or behavior of a particular system, but at substantial cost in complexity, reliability, maintenance and initial price.

Some clutch users, particularly motorcycle riders, from time to time wish to change the "feel" or behavior of the clutch. This had previously involved considerable expense, because the pressure plate, spring, and spring confinement components all needed to be changed. In general, it had previously been impossible to tailor the characteristics of a diaphragm spring clutch to a particular application, and it had not been possible to use a diaphragm spring clutch in certain high performance or high horsepower applications. Likewise, it had been impossible to similarly tailor a compression spring clutch to a particular application. Changing from a compression spring system to a diaphragm spring system had generally been prohibitively expensive because so many new parts had to be purchased. Also, such conversions were sometimes not available, or were of limited applicability. This inflexibility in clutch options tended to limit the usefulness and enjoyment of the motorcycles. Those concerned with these problems recognize the need for improvements.

These and other difficulties of the prior art have been overcome according to the present invention.

BRIEF SUMMARY OF THE INVENTION

The present invention has been developed in response to the current state of the art, and in particular, in response to these and other problems and needs that have not been fully or completely solved by currently available clutches. Thus, it is an overall object of the present invention to effectively resolve at least the problems and shortcomings identified herein. In particular, it is an object of the present invention to provide a clutch spring kit that includes all of the components required to assemble either a compression coil spring or a diaphragm spring biased pressure plate clutch using many common components. Embodiments of the present invention are particularly suitable for use in motorcycles, other land sea and air vehicles, agricultural and maintenance implements, stationary applications, and the like.

A preferred embodiment of the present invention comprises a clutch spring kit that includes a pressure plate member with spring confining members that are adapted to confine a spring member such as, for example, a diaphragm spring and/or one or more compression coil springs, or the like, in operative position with the pressure plate member. Suitable spring confining members where the spring member comprises a diaphragm spring include, for example, at least one peripheral flange element on the pressure plate member. Suitable spring confining members where the spring member comprises a compression coiled spring include, for example, at least one spring pocket or boss on the pressure plate member. A spring retaining member is provided to retain the spring member in spring biasing association with the pressure plate member. Typically, the spring retaining member includes at least an anchor element that anchors the spring retaining member in a relatively fixed axial position relative to the pressure plate member.

The pressure plate member in the kit has a spring side and a clutch side. The pressure plate member is configured so as to accommodate, alternatively or concurrently, a variety of spring members of different types. A peripheral flange element, for example, is adapted to confine one or more diaphragm springs in spring biasing association with the spring side of the pressure plate member. Generally, the peripheral flange element comprises one or more generally annular flanges, or the like, which may or may not be continuous. Such flanges may be in the form of a continuous rim, or a generally circular array of posts or arcuate segments positioned to engage the periphery of a diaphragm spring and confine it in operative position with the spring side of a pressure plate member. One or more spring confining members in the nature of a spring pocket, spring boss, or the like is also provided on the spring side of the pressure plate member. The spring pocket or boss is typically provided to confine the proximal generally cylindrical end of a compression coil spring in a desired location on a pressure plate member.

The function of the anchor element may be served, for example, by providing several bolt elements, clip elements, or the like. Such bolt elements may include at least a shoulder bolt, and may additionally include appropriate washers, spacers, or the like. These anchor elements serve at least two functions. They project axially and slidably through the pressure plate from the spring side to the opposed clutch side. Rotational and lateral movement of a pressure plate member may thus be substantially prevented by the presence of such elements. The shoulder bolts, clips, or the like are usually anchored, for example, to an axially fixed structure on the clutch side of the pressure plate, such as, for example, a clutch hub, or the like, and serve to retain the spring member in a fixed axial position relative to this axially fixed structure. The spring member is generally held between the axially stationary anchor elements and the axially moveable pressure plate member so that axial movement of the pressure plate relative to the axially fixed anchor elements serves to compress or relax the spring member. Typically, it is necessary to compress the spring member in order to release the clutch. Thus, axial movement of the pressure plate member engages or releases the clutch. Typically the axially fixed structure and the spring member and the pressure plate member rotate together about the longitudinal axis of the clutch system.

The kit also preferably includes at least two different types of spring members. A kit may include, for example, both one or more diaphragm spring elements and a set of compression coil spring elements. The shoulder bolts elements are preferably adapted to extending axially within the compression coil springs with the distal end of the spring trapped under the head of the bolt. This aids in holding or retaining the coiled springs in a spring biasing relationship with the pressure plate member, and, together with a spring confining member, in confining the coil spring in operative position on the spring side of the pressure plate member. The shoulder bolts also serve to retain (generally by the underside of the bolt head bearing on a retainer ring element) the diaphragm spring elements in spring biasing relationship with the pressure plate member. Thus, the pressure plate member and the shoulder bolt elements are preferably used interchangeably in the kit with both compression coil spring elements and diaphragm spring elements. This minimizes the number of components in the kit and simplifies its installation.

All that is needed to convert from one spring system to the other according to the present invention is the spring elements themselves and a retainer ring element for use with the diaphragm spring elements. The pressure plate member is especially configured so that it is common to all spring systems. The anchor element is preferably common to all spring systems.

The retainer ring element that is commonly associated with a diaphragm spring system may also serve as a spacer member where different thicknesses or combinations of diaphragm spring elements are used. Different thicknesses of spacers may be provided, if desired. Two or more diaphragm springs of different thicknesses or diameters (particularly outside diameters) may be provided. The diaphragm springs may have the same or different spring characteristics. Providing a plurality of diaphragm spring members with different spring characteristics permits the feel and character of the clutch to be finely adjusted to achieve exactly the desired feel and response. Adjustment is accomplished by adding or removing spring members to achieve the desired spring characteristics. In general, the length of the shoulder portions of the shoulder bolts is selected so that they will accommodate all possible configurations of spring member systems that can be assembled from the components in a kit. Spacers of appropriate thicknesses are provided to accommodate the variations in the axial lengths of the spring packs that result from the different spring configurations.

The coiled compression spring elements are typically (although not necessarily) confined by spring confining elements (for example, recessed spring pockets or upwardly projecting spring sockets, bosses, or the like) on the spring side of the pressure plate. The spring retention elements are preferably arrayed in a regular pattern and spaced from the peripheral flange of the pressure plate so that the coiled compression spring retention elements do not interfere with the operation of the diaphragm spring elements, and the peripheral flange does not interfere with the operation of the coiled compression spring elements. It is generally not beneficial to use more than one spring member system at the same time, although they can be used in combination, if desired. In general, specially shortened coil compression springs are required for use with a retainer ring, so the interchangeability of such shortened springs between spring systems would be limited unless spacers or washers were also used with the shortened coiled springs in the embodiment where they serve as the only spring member. This adds to the complexity of the kit and its use. One of the advantages of the present invention is that the kit can be successfully installed or changed from one spring system to another without a great deal of instruction or experience. Sufficient flexibility in the behavior of the clutch can generally be achieved without resorting to using both systems concurrently.

In a preferred embodiment of a clutch spring kit according to the present invention, the kit includes at least a pressure plate member that can accommodate both coiled compression spring elements and diaphragm spring elements, several substantially identical shoulder bolt or clip elements, and at least one and preferably two or more spring member systems (for example, a plurality of substantially identical coiled compression spring elements, and/or one or more diaphragm spring elements with a retainer ring element). Once a basic clutch spring kit with one spring member system has been obtained, a second different spring member system may be obtained at a later time, when desired. The two spring member systems can then be used interchangeably.

Other objects, advantages, and novel features of the present invention will become more fully apparent from the following detailed description of the invention when considered in conjunction with the accompanying drawings, or may be learned by the practice of the invention as set forth herein.

To acquaint persons skilled in the pertinent arts most closely related to the present invention, a preferred embodiment of a clutch system that illustrates a best mode now contemplated for putting the invention into practice is described herein by, and with reference to, the annexed drawings that form a part of the specification. The exemplary clutch assembly is described in detail without attempting to show all of the various forms and modifications in which the invention might be embodied. As such, the embodiments shown and described herein are illustrative, and as will become apparent to those skilled in the arts, can be modified in numerous ways within the scope and spirit of the invention, the invention being measured by the appended claims and not by the details of the specification or drawings.

BRIEF DESCRIPTION OF THE DRAWINGS

The present invention provides its benefits across a broad spectrum of clutch applications. While the description which follows hereinafter is meant to be representative of a number of such applications, it is not exhaustive. As those skilled in the art will recognize, the basic apparatus taught herein can be readily adapted to many power transmission systems. This specification and the claims appended hereto should be accorded a breadth in keeping with the scope and spirit of the invention being disclosed despite what might appear to be limiting language imposed by the requirements of referring to the specific examples disclosed.

Referring particularly to the drawings for the purposes of illustrating the invention and its presently understood best mode only and not limitation:

FIG. 1 is a diagrammatic plan view of a preferred embodiment of a multi-spring system pressure plate according to the present invention.

FIG. 2 is a cross-sectional view taken along line 2-2 in FIG. 1 including two compression coil springs mounted on shoulder bolts as in a compression coil spring biased configuration.

FIG. 3 is a cross-sectional view similar to FIG. 2 showing a further embodiment adapted to accommodate two or more diaphragm springs with different outside diameters, and two shoulder bolts as in a diaphragm spring biased configuration.

FIG. 11 is an exploded diagrammatic view of an embodiment wherein the multi-system pressure plate of FIG. 1 is deployed in a compression coil spring embodiment.

FIG. 12 is a diagrammatic exploded view of an embodiment wherein the multi-system pressure plate of FIG. 1 is deployed in a single diaphragm spring embodiment.

FIG. 13 is a diagrammatic fragmentary view of a compression coil spring embodiment wherein the proximal end of the coil spring element is confined on the spring side of a pressure plate member by a boss received within the coil spring element.

DETAILED DESCRIPTION OF THE PREFERRED EMBODIMENTS

Figure 4:
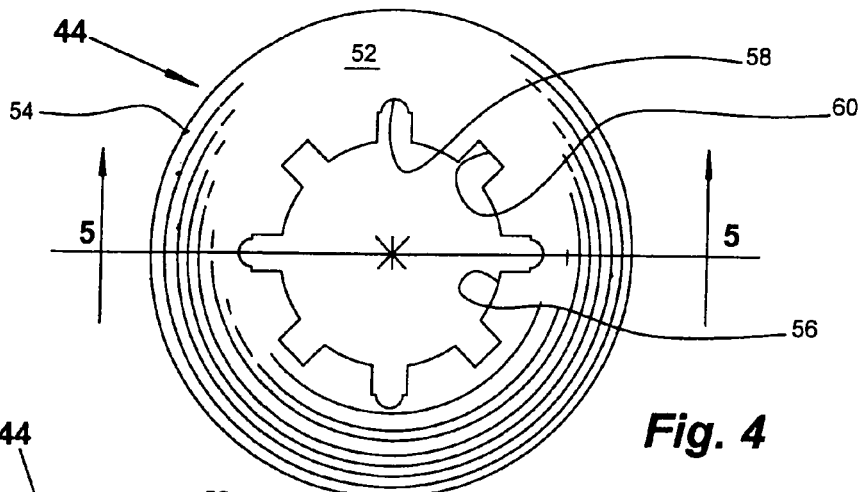
FIG. 4 is a diagrammatic plan view of a diaphragm spring that is adapted to be assembled together with the pressure plate shown diagrammatically in FIG. 1.
Figure 5:
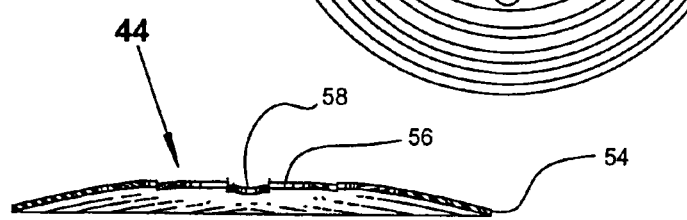
FIG. 5 is a cross-sectional view taken along line 5-5 in FIG. 4.
Figure 6:
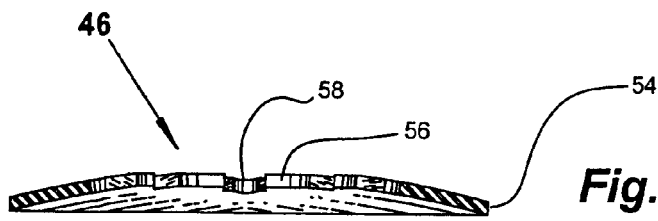
FIG. 6 is a cross-sectional view similar to FIG. 5 showing a thicker diaphragm spring that is adapted to be used interchangeably or in combination with the embodiment of diaphragm spring depicted in FIG. 5.

Referring now to the drawings wherein like reference numerals designate identical or corresponding parts throughout the several views. It is to be understood that the drawings are diagrammatic and schematic representations of various embodiments of the invention, and are not to be construed as limiting the invention in any way. The use of words and phrases herein with reference to specific embodiments is not intended to limit the meanings of such words and phrases to those specific embodiments. Words and phrases herein are intended to have their ordinary meanings, unless a specific definition is set forth at length herein.

Referring particularly to the drawings, there is illustrated generally at 10 a pressure plate member for a multi-spring system clutch. Pressure plate member 10 has a clutch side 12 and a spring side 14. Pressure plate member 10 is suited for use as an after market replacement for a conventional clutch pressure plate, or as a part of a custom designed clutch. Spring side 14 is adapted to being engaged by a spring member, which may be in the form of coiled compression springs of which 42 (FIGS. 2 and 11) is typical, or one or more diaphragm springs of which 44 and 46 are typical (FIGS. 4, 5, 10, and 12). The spring member is held in spring biasing association with pressure plate member 10 by shoulder bolt elements, of which 36 and 38 (FIG. 3) are typical, on the spring side 14 of pressure plate member 10.

In those embodiments where the spring member is a compression coil spring, 42 or 43, there are spring confining elements on the spring side 14 in the form of spring pockets of which 26 is typical, or annular bosses of which 27 (FIG. 13) is typical. Spring pockets 26 are formed as a generally circular bore that terminates in an annular face 22. A proximal end of a coiled compression spring is prevented from moving laterally of the pressure plate member 10 because it is surrounded by the cylindrical bore. The proximal end of the coiled compression spring is prevented from passing through the pressure plate member by the annular face 22. Annular boss 27 projects outwardly from spring side 14 and is received within the inside of generally cylindrical coiled spring 43. The diameter of the coil spring is increased to accommodate the boss 27. This expands the diameter of the spring to the point where a washer 29 is required to trap the distal end of the spring 43 under the head of bolt 38. The bore 20 extends entirely through the boss 27 and from spring side 14 to clutch side 12 at a constant diameter.

Figure 10:
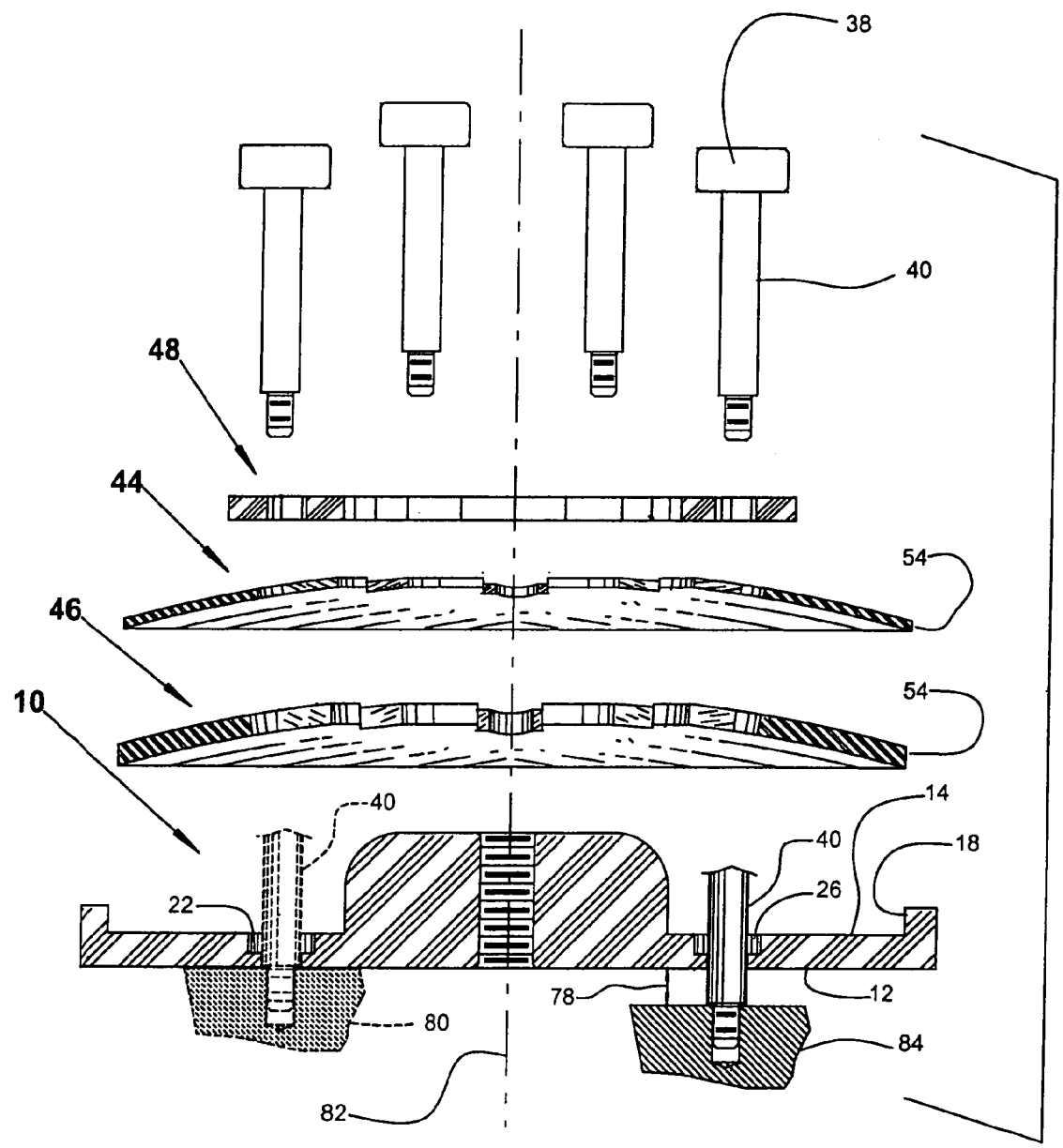
FIG. 10 is a diagrammatic exploded view of an embodiment wherein the multi-spring system pressure plate of FIG. 1 is deployed in a dual diaphragm spring embodiment, and wherein the axial excursion of the pressure plate between the clutch engaged and clutch disengaged positions is illustrated.

In those embodiments where the spring member comprises one or more diaphragm springs, the spring retention elements generally take the form of a peripheral flange element 16. The peripheral flange element serves to keep the diaphragm springs centered with respect to longitudinal axis 82 (FIG. 10). The peripheral flange element may include at least one annular boss 18 (FIGS. 2, 10, and 12), and may include two or more such annular bosses 32 and 34 (FIG. 3). Each of the annular bosses 18, 32 and 34 defines an upstanding rim that serves to receive the outer annular edge 54 of a diaphragm spring (FIGS. 4, 5, 6, 10, and 12). The annular bosses are generally in the form of a cylindrical wall, and serve to prevent the diaphragm springs from moving laterally, much as the cylindrical wall of spring pocket 26 and boss 27 prevents the proximal end of a coiled compression spring from moving laterally.

The diaphragm springs are in the nature of disk or Bellville springs. The various diaphragm springs typically have different properties. The diaphragm springs may be used one at a time (FIG. 12), or they may be stacked with two or more springs in one spring pack (FIG. 10). The spring characteristics are thus controlled to provide certain desired characteristics in the operation of the clutch. The properties of the diaphragm springs may be adjusted as desired by using different thicknesses (compare, for example, spring members 44 and 46 in FIGS. 5 and 6) or different outside diameters (for example, bosses 32 and 34, FIG. 3 are adapted to accommodate diaphragm springs of different outside diameters). There is generally a practical limit to the thickness of a diaphragm spring. Such spring members are generally formed by stamping or other sheet metal working operations. The formed spring members are then heat treated. In general, such forming and treating operations can not be performed, or are at least impractical to perform reliably on sheet metal that is thicker than approximately 0.125 inches thick. Diaphragm springs with a thickness of less than approximately 0.040 inches are generally not used in clutch applications.

The shoulder bolt elements 36 and 38 engage a structure that is generally axially fixed relative to the clutch plate member 10, and they serve at least two main purposes. They serve as guides for the pressure plate member 10 as it moves axially along axis 82 (FIG. 10). The shoulder bolt elements also confine the spring member in spring biasing association with the pressure plate member 10. The spring member is positioned between the shoulder bolt elements and the spring side of the pressure plate. The shoulder bolt elements retain the spring member in a generally axially fixed position with respect to the pressure plate member 10.

Axial movement of the pressure plate member 10 along longitudinal axis 82 (FIG. 10) serves to either compress or relax the spring member depending on the direction of the axial movement. The spring member is generally serves to bias the pressure plate member in an axial direction that the clutch side of the pressure plate member faces. The pressure plate member 10 is thus spring biased into a configuration where the clutch is engaged. Moving the pressure plate member axially against the force of the spring member to disengage the clutch at least initially increases the spring force. Where the spring member is a diaphragm spring, the spring force generally drops off abruptly when the spring is flattened, and little force is required to hold the clutch in the disengaged configuration. As the disengaging force is released the force of the diaphragm spring generally increases abruptly. Where the spring member is a coiled compression spring, the spring force generally increases as the pressure plate member is moved axially in the direction that the spring side of the pressure plate member faces, and it requires considerable force to hold the clutch in the released configuration. The compression spring is compressed during the release phase of the release-engage cycle of the clutch operation. During the engagement part of the clutch release-engage cycle, the coiled compression spring expands and the spring force generally decreases somewhat in a generally uniform manner.

The limits of the axial travel of the pressure plate member between full clutch engagement and full clutch disengagement are illustrated in FIG. 10. On the clutch release phase of the clutch release-engage cycle the pressure plate member 10 moves axially through distance 78 to the fully released configuration. A shoulder bolt is anchored to axially fixed structure 84 so that the cylindrical body 40 of a shoulder bolt slides through bore 20 (FIGS. 1, 2, 3, and 13) with the internal cylindrical wall 24 of bore 20 in close but sliding engagement with the external cylindrical wall of cylindrical body 40. The position of axially fixed structure 80 (FIG. 10) indicates in phantom lines the axial position of the pressure plate member relative to the fixed structure when the clutch is fully engaged. For purposes of ease of illustration, the limits of travel of the pressure plate member are illustrated by showing the relative positions of the fixed structures 80 and 84 and the pressure plate member at the fully engaged and fully released positions. It is emphasized that the structures are typically axially fixed relative to the pressure plate member and to one another. It is the pressure plate member that moves through distance 78 between the position shown with reference to the structure 80 and the position shown with reference to structure 84. The structures 80 and 84 generally do not move relative to one another. The clutch is generally fully engaged in the configuration illustrated by the position of structure 80, and fully disengaged in the configuration illustrated by the position of structure 84. The distance 78 for a typical motorcycle clutch is generally in the nature of approximately 0.080 to 0.160 inches, although greater or smaller axial distances may be employed in certain clutches.

Typically, pressure plate members according to the present invention include a central hub 28. In general, in previous proposed clutches a clutch actuation mechanism (not shown) was actuatingly attached to the pressure plate so as to provide the operator with a way to move the pressure plate member through the release-engagement cycle. Numerous clutch actuation mechanisms had been previously proposed. For example, it had been previously proposed to provide a threaded axial bore or the like centrally of a conventional pressure plate, and to threadably attach a clutch activation mechanism to the threaded bore. Various other attachment mechanisms had also been proposed. The thusly attached clutch activation mechanism then either pushed or pulled the conventional pressure plate in an axial direction to initiate the clutch release-engagement cycle. The present invention is not limited to any particular clutch activation mechanism. By way of example only, a threaded axial bore 30 is illustrated extending axially through hub 28 and concentric with longitudinal axis 82. The purpose of threaded axial bore 30 is to provide a location for the attachment of a clutch activation mechanism. Other arrangements for the mounting of a clutch activation mechanism may be provide, if desired.

The diaphragm spring members generally have a convex side 52, a radially outer edge 54, and a radially inner edge 56. The inner diameter of the spring member is generally large enough that the inner edge 56 clears the hub 28 as the spring member flexes. See, for example, FIGS. 4, 10 and 12. The inner edge 56 may, if desired, be broken or interrupted as at 58 to permit the passage of shoulder bolt elements. The inner edge may also be broken or interrupted as at 60 to, for example, reduce the force required to flex the spring member, or the like.

Figure 7:
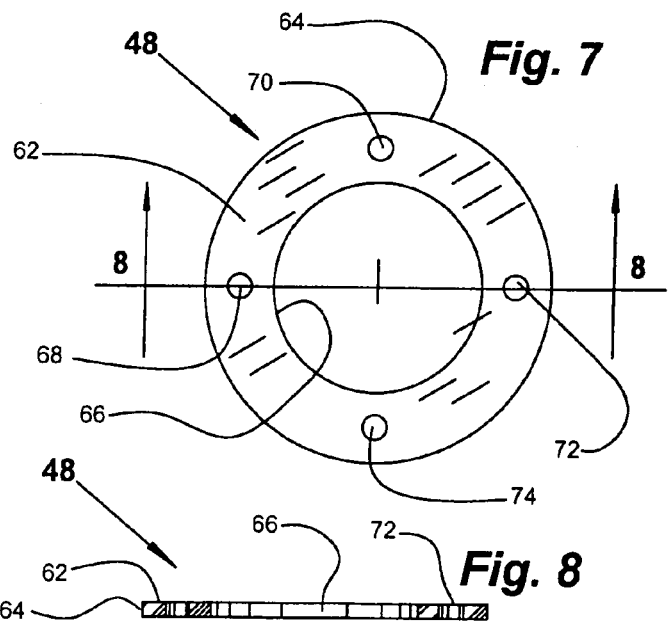
FIG. 7 is a diagrammatic plan view of a retainer plate or ring that is particularly adapted for use with a variety of diaphragm spring configurations.
Figure 9:
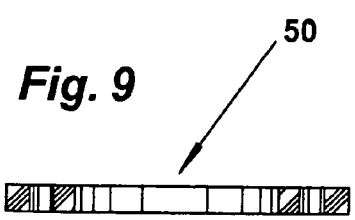
FIG. 9 is a cross-sectional view similar to FIG. 8 showing a thicker retainer plate that is adapted to be used interchangeably with the embodiment of FIG. 8.
Figure 8:
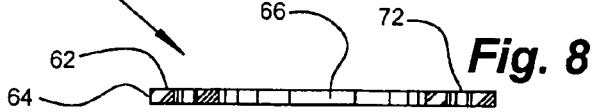
FIG. 8 is a cross-sectional view taken along line 8-8 in FIG. 7.

Diaphragm spring members are preferably mounted in operative position on the spring side of the pressure plate member by their peripheral edges rather than being mounted on a central hub such as shown at 28. The retention of the spring member on the spring side of a pressure plate member is generally accomplished by anchor elements. Where bolts serve as the anchor members for diaphragm springs, a retainer ring such as that shown at 48 (FIGS. 7 and 10) is preferably used to spread the load uniformly around the diaphragm spring(s). The width of the retainer ring between inner annular edge 66 and outer annular edge 64, and the thickness of body 62 are such that when bolts are inserted through holes 68, 70, 72, and 74, the undersides of the bolt heads (of which 39 is typical) engage body 62 and cause retainer ring 48 to bear firmly and uniformly against the surface of the diaphragm spring. As indicated by comparison of retainer rings 48 and 50 (FIG. 9), the retainer rings may be provided in different thicknesses. Two or more retainer rings may be used in one spring pack, if desired. This accommodates the use of different thickness of diaphragm springs or spring packs with two or more springs (FIG. 10) without the need for different length bolts. Generally, the retainer ring does not extend for the full width of the diaphragm spring. See, for example, FIGS. 10 and 12. The inner diameter of a retainer ring is generally such that it clears the hub 28 in all possible operational configurations.

It will be appreciated that pressure plate members may be devised with the capability to used with multiple spring systems other than those illustrated herein. Accordingly, the present invention should not be construed as limited solely to the embodiments illustrated here.

Clutch components such as springs, anchor members, and pressure plates, are typically constructed from steel or other metals, because of the substantial loads and high temperature conditions encountered in normal operation. However, any material or combination of materials, compatible with the functions and operation of a clutch are contemplated as being within the scope of the present invention.

What has been described are preferred embodiments in which modifications and changes may be made without departing from the spirit and scope of the accompanying claims. Many modifications and variations of the present invention are possible in light of the above teachings. It is therefore to be understood that, within the scope of the appended claims, the invention may be practiced otherwise than as specifically described.

What is claimed is:

1. A clutch spring kit comprising:
   a pressure plate member, said pressure plate member having a spring side and a clutch side, and a spring confining member including at least a diaphragm spring confining member adapted to confining at least one diaphragm spring member on said spring side, and a compression coil spring confining member adapted to confining at least one compression coil spring member on said spring side;
   a plurality of shoulder bolt elements in said clutch spring kit, said shoulder bolt elements being adapted to projecting axially slidably through said pressure plate member, said shoulder bolt elements being adapted to retaining at least one said compression coil spring member and/or at least one said diaphragm spring member on said spring side in spring biasing association with said pressure plate member;
   at least one said diaphragm spring; and
   at least one compression coil spring member.

2. A clutch spring kit of claim 1 wherein said compression coil spring confining member includes a spring pocket adapted to mounting said compression coil spring member.

3. A clutch spring kit of claim 1 including at least two said diaphragm spring members.

4. A clutch spring kit of claim 1 including a plurality of said compression coil spring members.

5. A clutch spring kit of claim 1 wherein said diaphragm spring confining member includes at least two substantially concentric flanges.

6. A clutch spring kit of claim 1 including at least two said diaphragm spring members wherein each of said diaphragm spring members has a different spring characteristic.

7. A clutch spring kit comprising:
   a pressure plate member for a spring biased clutch, said pressure plate member having a spring side and an opposed clutch side, said pressure plate member including a spring confining member adapted to confining a spring member on said spring side in operative association with said pressure plate member, said spring confining member including at least a diaphragm spring element confining member and a compression coil spring confining member, and an array of axial bores extending through said pressure plate member;
   a plurality of shoulder bolt elements in said clutch spring kit, said shoulder bolt elements being adapted to projecting generally axially and slidably through said array of axially bores and to being retentively associated on said spring side with said spring member; and
   said spring member comprising at least one diaphragm spring element and at least one compression coil spring element, said spring member being adapted to resiliently biasing said pressure plate member in an axial direction that said clutch side faces.

8. A clutch spring kit of claim 7 wherein said diaphragm spring element confining member includes a peripheral flange element on said spring side.

9. A clutch spring kit of claim 8 wherein said peripheral flange element is adapted to confining a plurality of said diaphragm spring elements on said spring side.

10. A clutch spring kit of claim 7 wherein said compression coil spring confining member includes a plurality of spring pockets generally surrounding said axially extending bores on said spring side and each said spring pocket being adapted to receiving a proximal end of a said compression coil spring element.

11. A clutch spring kit of claim 7 including a plurality of said compression coil spring elements.

* * * * *